(12) United States Patent
Matsuno

(10) Patent No.: US 8,204,678 B2
(45) Date of Patent: Jun. 19, 2012

(54) VEHICLE DRIVE ASSIST SYSTEM

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 497 days.

(21) Appl. No.: 12/427,329

(22) Filed: Apr. 21, 2009

(65) Prior Publication Data

US 2009/0265107 A1 Oct. 22, 2009

(30) Foreign Application Priority Data

Apr. 22, 2008 (JP) ................... 2008-111599

(51) Int. Cl.
*G05D 1/02* (2006.01)
(52) U.S. Cl. ...................................... 701/300
(58) Field of Classification Search .................. 701/300
See application file for complete search history.

(56) References Cited

U.S. PATENT DOCUMENTS

2002/0140551 A1* 10/2002 Gutta et al. .................. 340/435
2008/0004807 A1* 1/2008 Kimura et al. ............... 701/301

FOREIGN PATENT DOCUMENTS

JP 2007-207047 8/2007

* cited by examiner

*Primary Examiner* — Robert M. Pond
(74) *Attorney, Agent, or Firm* — Smith, Gambrell & Russell, LLP

(57) ABSTRACT

A control unit sets a front-end collision risk of a subject vehicle against a front vehicle in accordance with a time headway of the subject vehicle and a margin time to front-end collision of the subject vehicle, and a rear-end collision risk of the subject vehicle by a rear vehicle in accordance with a time headway of the rear vehicle and a margin time to rear-end collision of the subject vehicle, the margin time to rear-end collision having a larger weight than that of the margin time to front-end collision in the front-end collision risk against the front vehicle. Brake control and alarm control are performed in accordance with the front-end collision risk against the front vehicle and the rear-end collision risk by the rear vehicle.

20 Claims, 5 Drawing Sheets

VEHICLE DRIVE ASSIST SYSTEM

CROSS REFERENCE TO RELATED APPLICATIONS

The disclosure of Japanese Patent Application No. 2008-111599 filed on Apr. 22, 2008 including the specification, drawings and abstract is incorporated herein by reference in its entirety.

BACKGROUND OF THE INVENTION

1. Field of the Invention

The present invention relates to a vehicle drive assist system that recognizes a front vehicle and a rear vehicle and prevents a subject vehicle from colliding with the front vehicle and the rear vehicle.

2. Description of the Related Art

In recent years, various techniques have been suggested for vehicles, the techniques which detect a front vehicle by using a front recognizer, such as a camera or a laser radar, and to avoid a subject vehicle from contacting the front vehicle, assist drive of the subject vehicle by providing a predetermined alarm or automatic brake control. Such techniques have been practically used. In addition, a technique has been suggested, which detects a rear vehicle and provides alarm control by taking into account the rear vehicle.

For example, Japanese Unexamined Patent Application Publication No. 2007-207047 has disclosed a technique for a vehicle stop alarm device, which detects a proximity state of a subject vehicle to a stop-requested point based on a current position, the stop-requested point, and a subject vehicle speed, determines a collision risk based on a relative positional relationship between the subject vehicle and at least one of a front vehicle and a rear vehicle, and provides alarm control based on the proximity state and the collision risk.

A driver can relatively easily recognize a distance between the front vehicle and the subject vehicle, a relative speed between the front vehicle and the subject vehicle, and a brake operating state of the front vehicle. However, the driver recognizes the rear vehicle only through a mirror, and a time the driver looks at the mirror must be short. It is difficult to recognize a distance from the subject vehicle to the rear vehicle, a relative speed between the rear vehicle and the subject vehicle, and a brake operating state of the rear vehicle. Regarding the above-mentioned problem, the above-described technique of the alarm device disclosed in Japanese Unexamined Patent Application Publication No. 2007-207047 controls the alarm by using the collision risk merely based on the relative positional relationship between the subject vehicle and at least one of the front and the rear vehicle, it is suspected that the alarm is not properly provided.

SUMMARY OF THE INVENTION

In light of the situation, an object of the present invention is to provide a vehicle drive assist system that properly recognizes travel states of a front vehicle, a subject vehicle, and a rear vehicle, assists drive such that a subject vehicle position relative to the front vehicle and the rear vehicle becomes an optimum position corresponding to actual travel by taking into account drive states of the front vehicle and the subject vehicle and drive states of the subject vehicle and the rear vehicle, thereby improving feeling of drive.

A vehicle drive assist system according to an aspect of the present invention includes front vehicle information detecting means for detecting front vehicle information; rear vehicle information detecting means for detecting rear vehicle information; front-end collision risk calculating means for calculating a front-end collision risk against the front vehicle by concerning at least an element of a relative speed between the front vehicle and the subject vehicle; rear-end collision risk calculating means for calculating a rear-end collision risk by the rear vehicle by concerning at least an element of a relative speed between the rear vehicle and the subject vehicle with a larger weight than a weight of the element of the relative speed in the front-end collision risk against the front vehicle; and control means for performing travel control in accordance with the front-end collision risk against the front vehicle and the rear-end collision risk by the rear vehicle.

With the vehicle drive assist system of the aspect, the travel states of the front vehicle, the subject vehicle, and the rear vehicle can be properly recognized, drive can be assisted such that the subject vehicle position relative to the front vehicle and the rear vehicle becomes an optimum position corresponding to actual travel by taking into account the drive states of the front vehicle and the subject vehicle and the drive states of the subject vehicle and the rear vehicle, thereby improving feeling of drive.

DESCRIPTION OF THE PREFERRED EMBODIMENT

An embodiment of the present invention will now be described with reference to the drawings.

Figure 1:
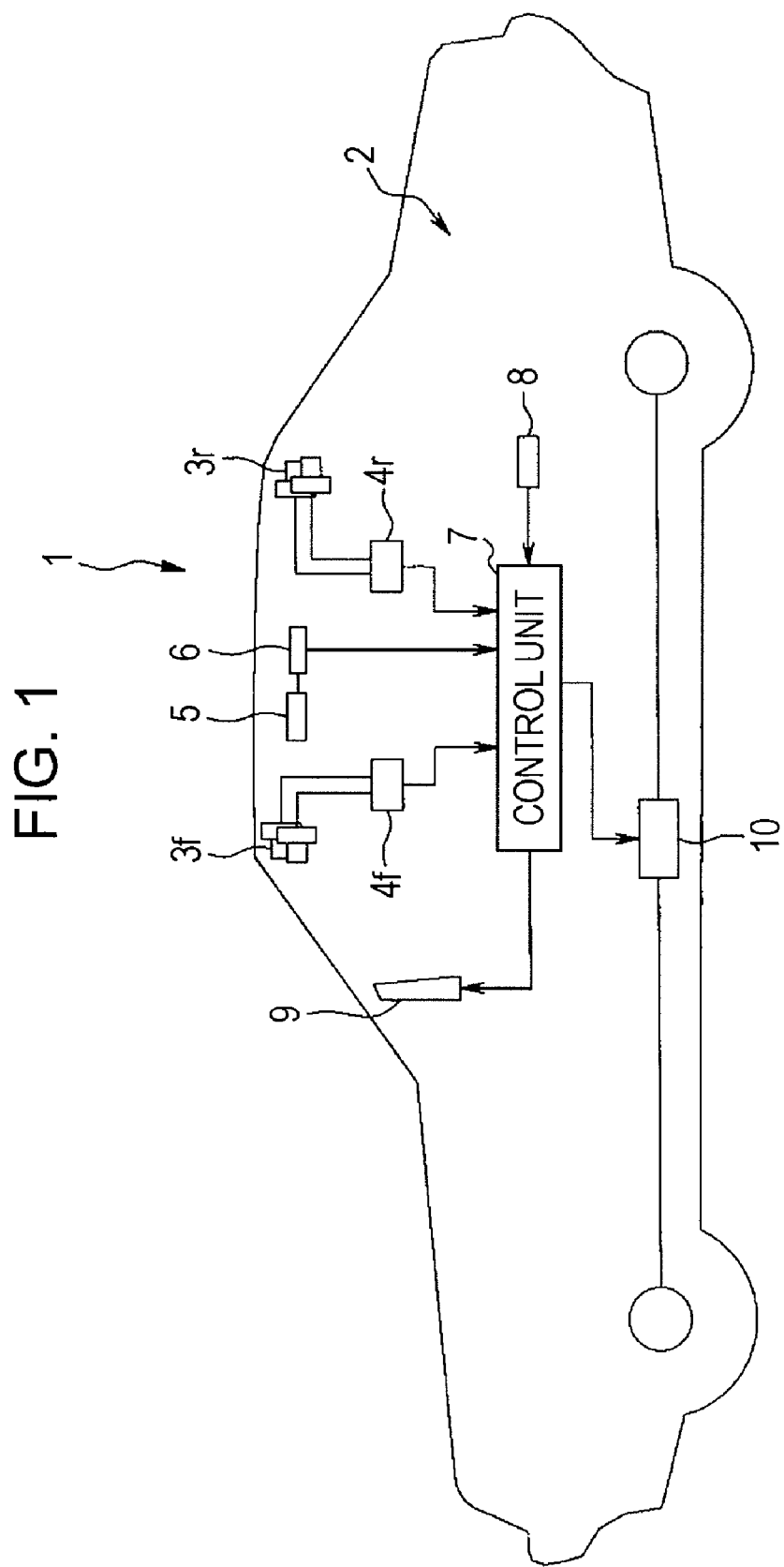
FIG. 1 is a configuration diagram briefly showing a drive assist system mounted on a vehicle.
Figure 2:
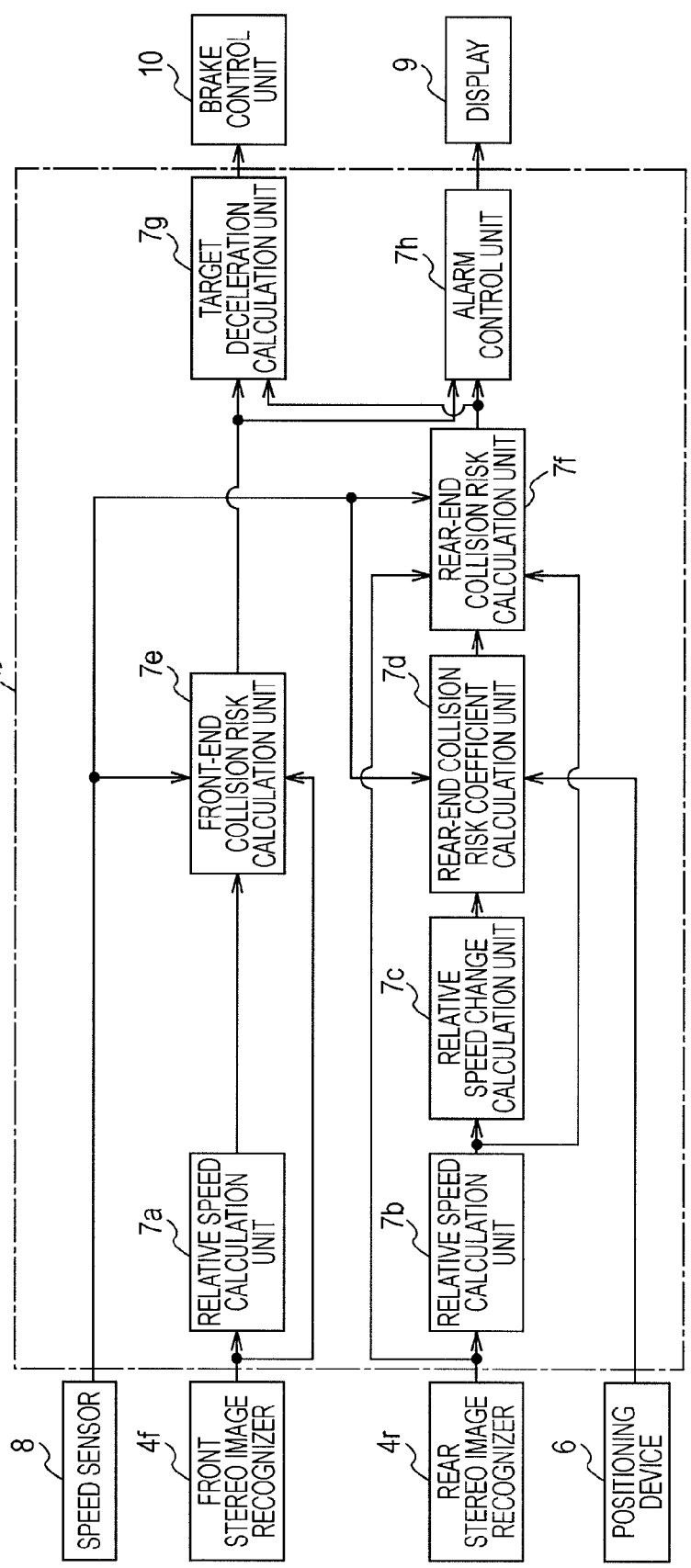
FIG. 2 is a functional block diagram of a control unit.
Figure 3:
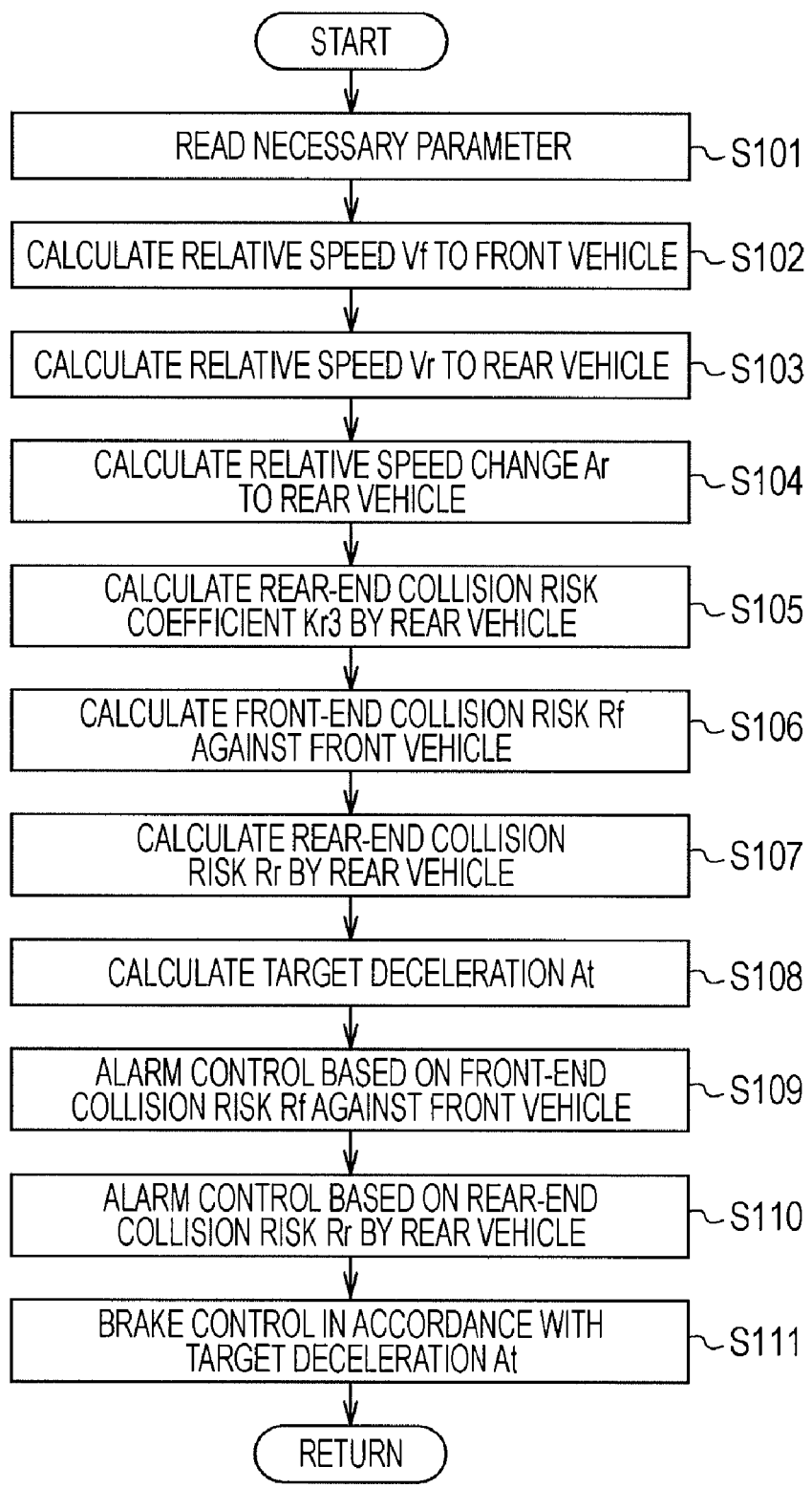
FIG. 3 is a flowchart of a drive assist control program.
Figure 4:
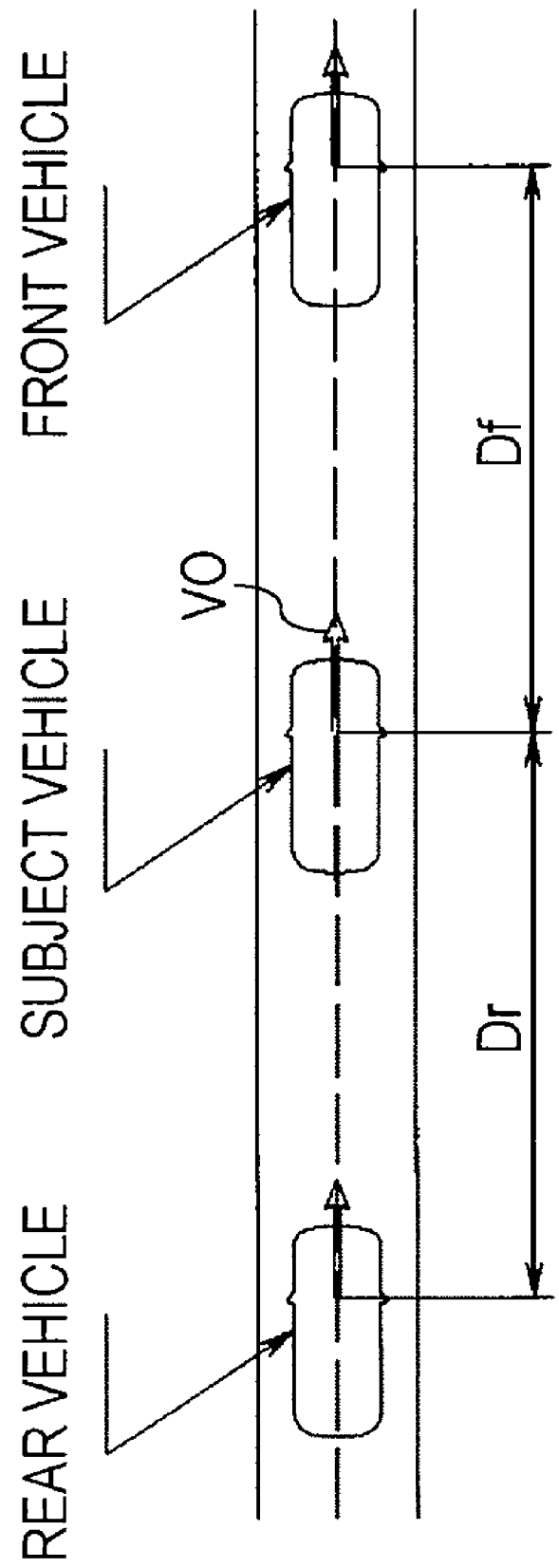
FIG. 4 is an explanatory view showing an example relationship among a front vehicle, a subject vehicle, and a rear vehicle.
Figure 5:
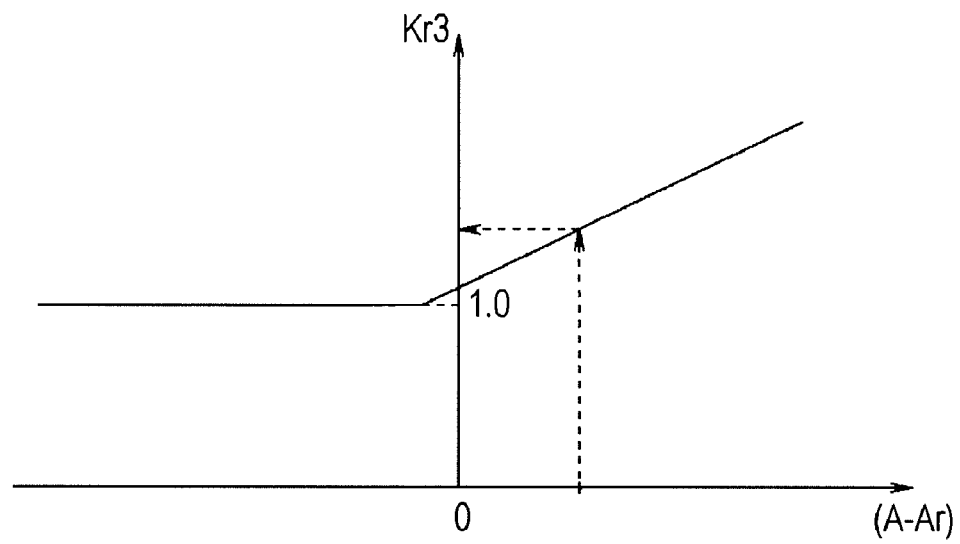
FIG. 5 is a diagram showing setting of a rear-end collision risk coefficient by the rear vehicle.
Figure 6:
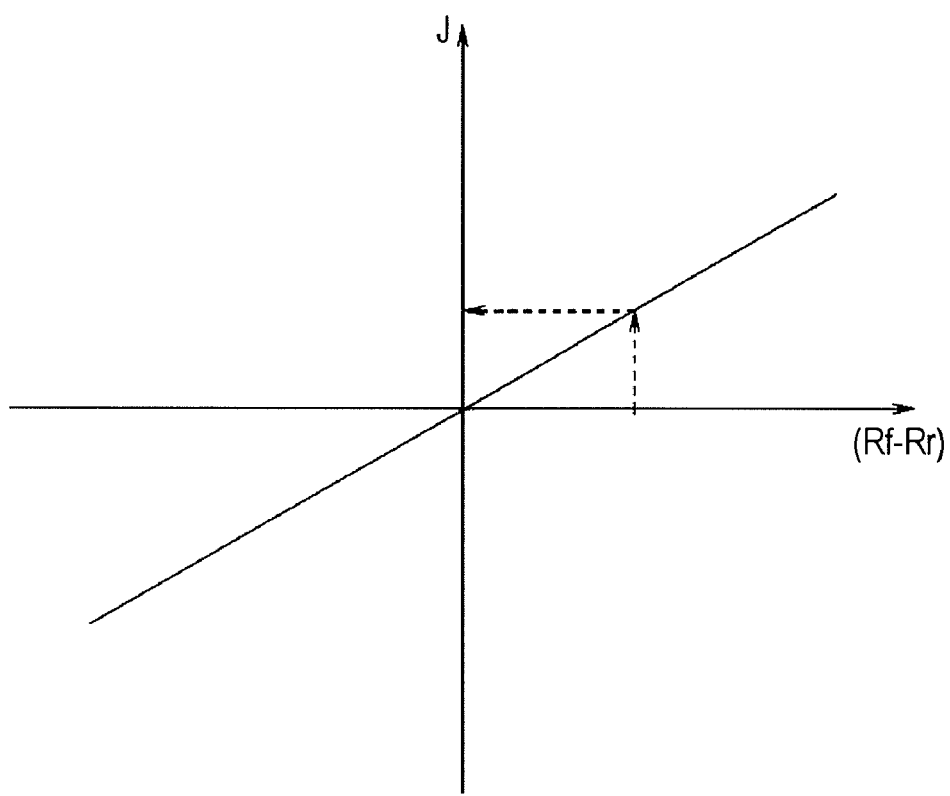
FIG. 6 is a diagram showing setting of a target deceleration correction amount.

FIGS. 1 to 6 show an embodiment of the present invention. FIG. 1 is a configuration diagram briefly showing a drive assist system mounted on a vehicle. FIG. 2 is a functional block diagram of a control unit. FIG. 3 is a flowchart of a drive assist control program. FIG. 4 is an explanatory view showing an example relationship among a front vehicle, a subject vehicle, and a rear vehicle. FIG. 5 is a diagram showing setting of a rear-end collision risk coefficient by the rear vehicle. FIG. 6 is a diagram showing setting of a target deceleration correction amount.

In FIG. 1, a vehicle (subject vehicle) 1 of an automobile or the like has a drive assist system 2 mounted thereon. The drive assist system 2 mainly includes a front stereo camera 3$f$, a rear stereo camera 3$r$, a front stereo image recognizer 4$f$, a rear stereo image recognizer 4$r$, a communication device 5, a positioning device 6, and a control unit 7. The subject vehicle 1 also includes a vehicle speed sensor 8 that detects a subject vehicle speed V0. The detected subject vehicle speed V0 is input to the control unit 7.

Each of the front and rear stereo cameras 3$f$ and 3$r$ includes a stereo optical system, which includes, for example, a pair of (left and right) CCD cameras using solid-state image devices such as CCDs. The left and right charge-coupled device (CCD) cameras are attached to each of front and rear portions of a ceiling of a vehicle cabin with a predetermined gap between the left and right CCD cameras. The CCD cameras stereographically capture objects outside the subject vehicle from different viewpoints, and input obtained image data to the front stereo image recognizer 4f and the rear stereo image recognizer 4r.

For example, images from the front and rear stereo cameras 3f and 3r are processed in the front stereo image recognizer 4f and the rear stereo image recognizer 4r as follows.

Each of pairs including a pair of stereo images of a front environment of the subject vehicle captured by the CCD cameras of the front stereo camera 3f, and a pair of stereo images of a rear environment of the subject vehicle captured by the CCD cameras of the rear stereo camera 3r is processed to obtain distance information by the principle of triangulation using a shift amount between corresponding positions in the pair of stereo images. Thus, a distance image representing a three-dimensional distance distribution is generated.

Using the data, known grouping processing is performed; the data is compared with, three-dimensional road form data, side wall data, three-dimensional object data, etc., which are previously stored; and white line data, side wall data of, for example, a guardrail or a curb extending along the road, three-dimensional object data of, for example, a vehicle or a pedestrian, are extracted. Different numbers are assigned to the extracted white line data, side wall data, and three-dimensional object data.

Further, the three-dimensional object data is classified into three types by comparing the subject vehicle speed V0 with a three-dimensional object speed (=(temporal change in distance from subject vehicle 1)+(subject vehicle speed V0)). The three types include an opposite-direction moving object moving toward the subject vehicle 1 (i.e., a three-dimensional object with a speed which is a minus value and an absolute value of which is larger than a preset threshold value), a static object assumed to be in static state (i.e., a three-dimensional object with a speed of approximately 0 km/h, an absolute value of which is the threshold value or smaller), and a same-direction moving object moving in substantially the same direction as a moving direction of the subject vehicle 1 (i.e., a three-dimensional object with a speed which is a plus value and an absolute value of which is larger than the preset threshold value).

Each of the front stereo image recognizer 4f and the rear stereo image recognizer 4r outputs a distance from the subject vehicle to each three-dimensional object, a three-dimensional object position in an X-Z coordinate system around a camera position of the subject vehicle 1 (in which X represents a horizontal direction, and Z represents a front-rear direction, with right and forward directions of the subject vehicle 1 assumed to be plus (+)), etc., as three-dimensional object data, to the control unit 7.

The front stereo image recognizer 4f determines a vehicle which is located in a front travel area of the subject vehicle 1 (i.e., a predetermined front area set with reference to a current position of the subject vehicle 1) and is the most proximate to the subject vehicle 1, as a front vehicle from among three-dimensional objects. A distance Df from the subject vehicle 1 to the front vehicle (i.e., a distance between the front vehicle and the subject vehicle), a front vehicle position in the X-Z coordinate system around a camera position of the subject vehicle 1, etc., are output as front vehicle information to the control unit 7 (see FIG. 4). That is, the front stereo image recognizer 4f serves as front vehicle information detecting means.

The rear stereo image recognizer 4r determines a vehicle which is located in a rear travel area of the subject vehicle 1 (i.e., a predetermined rear area set with reference to the current position of the subject vehicle 1) and is the most proximate to the subject vehicle 1, as a rear vehicle from among three-dimensional objects. A distance Dr from the subject vehicle 1 to the rear vehicle (i.e., a distance between the rear vehicle and the subject vehicle), a rear vehicle position in the X-Z coordinate system around a camera position of the subject vehicle 1, etc., are output as rear vehicle information to the control unit 7 (see FIG. 4). That is, the rear stereo image recognizer 4r serves as rear vehicle information detecting means.

The communication device 5 serves as, for example, a device corresponding to intelligent transport system (ITS). The communication device 5 receives light and radio beacon from road ancillary facilities to acquire various information, such as traffic jam information, weather information, and traffic regulation information of a specific area. Also, the communication device 5 sends and receives vehicle information through inter-vehicle communication with other vehicles traveling near the subject vehicle 1. In the inter-vehicle communication of this embodiment, communication is held with a vehicle located in a communication available area by using a carrier signal within a predetermined frequency band. The communication device 5 exchanges information, such as a vehicle type, a vehicle position, a vehicle speed, an acceleration/deceleration state, a brake operating state, and a blinker state, with the vehicle in the area, and outputs the acquired information to the control unit 7.

The positioning device 6, which is, for example, a navigation device, measures the position of the subject vehicle 1, calculates and combines the measured subject vehicle position and map information, displays the current position of the subject vehicle 1 and a peripheral map on a display 9 in accordance with an operation input, such as scale change of the map, specific indication of place names, and display switching to local information, and displays various information such as road and traffic information received through the communication device 5. The position of the subject vehicle 1 is measured on the basis of, for example, a position of the subject vehicle 1 obtained by a radio wave from a positioning satellite such as global positioning system (GPS), a position of the subject vehicle 1 obtained by dead reckoning using signals from a geomagnetic sensor and a wheel speed sensor, and information obtained through the communication device 5. The positioning information is also transmitted to other devices in the subject vehicle 1 through an in-vehicle communication system, and is transmitted to other vehicle through the inter-vehicle communication with the communication device 5.

The positioning device 6 estimates a heading direction of the subject vehicle 1 by using a record of a past change in the subject vehicle position, generates an X-Z coordinate system similar to the above-described system with reference to the subject vehicle 1, arranges other vehicle position and the like obtained through the communication device 5 in the X-Z coordinate system, and outputs the resultant to the control unit 7.

The control unit 7 receives information from the front stereo image recognizer 4f and the rear stereo image recognizer 4r. The information from the front stereo image recognizer 4f includes information relating to a front vehicle; information of a position of a three-dimensional object other than the front vehicle, white line coordinates, a white line recognition distance, and subject vehicle travel path coordinates; and information of an X-Z coordinate system representing the position of the three-dimensional object created by using a stereo image. The information from the rear stereo image recognizer 4r includes information relating to a rear vehicle; information of a position of a three-dimensional object other than the rear vehicle, white line coordinates, a white line recognition distance, and subject vehicle travel path coordinates; and information of an X-Z coordinate system representing the position of the three-dimensional object created by using a stereo image. Also, the control unit 7 receives information of the X-Z coordinate system transmitted from the positioning device 6 and representing the three-dimensional object position created on the basis of the inter-vehicle communication with the communication device 5, information of a brake signal or the like transmitted from each three-dimensional object, a subject vehicle speed V0 from the vehicle speed sensor 8, etc.

The control unit 7, by using the input signals described above, under a drive assist control program (described later), sets a front-end collision risk Rf of the subject vehicle 1 against the front vehicle in accordance with a time headway THWf of the subject vehicle 1 and a margin time to front-end collision TTCf of the subject vehicle 1, and also sets a rear-end collision risk Rr of the subject vehicle 1 by the rear vehicle in accordance with a time headway THWr of the rear vehicle and a margin time to rear-end collision TTCr of the subject vehicle 1, the margin time to rear-end collision TTCr having a larger weight than that of the margin time to front-end collision TTCf in the front-end collision risk Rf against the front vehicle. The control unit 7 outputs a signal to the display 9 to perform alarm control in accordance with the front-end collision risk Rf against the front vehicle and the rear-end collision risk Rr by the rear vehicle. Also, the control unit 7 sets a target deceleration At and outputs a signal to a brake control unit 10 to perform brake control. Calculation of the time headway THWf of the subject vehicle 1, the margin time to front-end collision TTCf of the subject vehicle 1, the time headway THWr of the rear vehicle, the margin time to rear-end collision TTCr of the subject vehicle 1, the front-end collision risk Rf against the front vehicle, and the rear-end collision risk Rr by the rear vehicle will be described below.

Referring to FIG. 2, the control unit 7 mainly includes relative speed calculation units 7a and 7b, a relative speed change calculation unit 7c, a rear-end collision risk coefficient calculation unit 7d, a front-end collision risk calculation unit 7e, a rear-end collision risk calculation unit 7f, a target deceleration calculation unit 7g, and an alarm control unit 7h.

The relative speed calculation unit 7a receives the distance Df between the front vehicle and the subject vehicle 1 from the front stereo image recognizer 4f. A relative speed Vf between the front vehicle and the subject vehicle 1 is calculated with Equation (1) as follows, and the calculated relative speed Vf is output to the front-end collision risk calculation unit 7e:

$$Vf=(\Sigma_i=0^{n-1}Df(k-n-i)/n)-(\Sigma_i=0^{n-1}Df(k-i)/n) \quad (1),$$

where k is a calculation count, and n is the number of sampling times to obtain a mean value.

The relative speed calculation unit 7b receives the distance Dr between the rear vehicle and the subject vehicle 1 from the rear stereo image recognizer 4r. A relative speed Vr between the rear vehicle and the subject vehicle 1 is calculated with Equation (2) as follows, and the calculated relative speed Vr is output to the relative speed change calculation unit 7c and the rear-end collision risk calculation unit 7f:

$$Vr=(\Sigma_i=0^{n-1}Dr(k-n-i)/n)-(\Sigma_i=0^{n-1}Dr(k-i)/n) \quad (2).$$

The relative speed change calculation unit 7c receives the relative speed Vr between the rear vehicle and the subject vehicle 1 from the relative speed calculation unit 7b. A change (relative speed change) Ar of the relative speed Vr between the rear vehicle and the subject vehicle 1 is calculated with Equation (3) as follows, and the calculated relative speed change Ar is output to the rear-end collision risk coefficient calculation unit 7d:

$$Ar=(\Sigma_i=0^{n-1}Vr(k-n-i)/n)-(\Sigma_i=0^{n-1}Vr(k-i)/n) \quad (3).$$

The rear-end collision risk coefficient calculation unit 7d receives brake operation information of the rear vehicle from the positioning device 6, the subject vehicle speed V0 from the vehicle speed sensor 8, and the relative speed change Ar from the relative speed change calculation unit 7c. Then, a rear-end collision risk coefficient Kr3 is set with reference to a preset map (FIG. 5) in which the horizontal axis plots a value (A−Ar) by subtracting the relative speed change Ar from a deceleration A of the subject vehicle 1 obtained through calculation of a change of the subject vehicle speed V0. The rear-end collision risk coefficient Kr3 is output to the rear-end collision risk calculation unit 7f.

Regarding the map for setting the rear-end collision risk coefficient Kr3 shown in FIG. 5, in particular, in a drive region in which the value (A−Ar) is 0 or larger, the rear-end collision risk coefficient Kr3 is set to a value larger than 1.0. In this embodiment, though described later, the rear-end collision risk coefficient Kr3 is a coefficient that determines a weight, and when the value is larger than 1.0, the influence of the rear-end collision risk Rr is increased.

In other words, in a relatively small drive region (A−Ar>0) in which the relative speed change (i.e., a deceleration of the rear vehicle) Ar is smaller than the deceleration A of the subject vehicle 1, the rear-end collision risk coefficient Kr3 is set to a value lager than 1.0, and the influence of the rear-end collision risk Rr is corrected to become large.

In contrast, in a relatively large drive region (A−Ar<0) in which the relative speed change (i.e., the deceleration of the rear vehicle) Ar is larger than the deceleration A of the subject vehicle 1, the rear-end collision risk coefficient Kr3 is set to 1.0, and setting of the influence of the rear-end collision risk Rr is set in a normal state.

This setting concerns a situation in which the rear vehicle is not decelerated although the subject vehicle 1 is rapidly decelerated. This provides correction to effectively deal with a case where the rear vehicle does not pay attention to the decelerating subject vehicle 1.

When the inter-vehicle communication is available between the subject vehicle 1 and the rear vehicle and the brake operation information of the rear vehicle is not input from the positioning device 6, the rear-end collision risk coefficient calculation unit 7d sets the rear-end collision risk coefficient Kr3 to a value (for example, 1.2) larger than the preset value of 1.0, and outputs the set value to the rear-end collision risk calculation unit 7f.

The front-end collision risk calculation unit 7e receives the subject vehicle speed V0 from the vehicle speed sensor 8, the distance Df between the front vehicle and the subject vehicle 1 from the front stereo image recognizer 4f, and the relative speed Vf between the front vehicle and the subject vehicle 1 from the relative speed calculation unit 7a. The front-end collision risk Rf against the front vehicle is calculated with Equation (4) as follows, and the calculated front-end collision risk Rf is output to the target deceleration calculation unit 7g and the alarm control unit 7h:

$$Rf=1/(Kf1\cdot THWf-Kf2\cdot(1/TTCf)) \quad (4),$$

where THWf is a time headway of the subject vehicle 1, which is obtained with calculation using THWf=Df/V0, TTCf is a margin time to front-end collision of the subject vehicle 1, which is obtained with calculation using TTCf=Df/Vf, and Kf1 and Kf2 are weighting coefficients preset by experiments or the like.

In this embodiment, the relative speed calculation unit 7a and the front-end collision risk calculation unit 7e serve as front-end collision risk calculating means.

The rear-end collision risk calculation unit 7f receives the subject vehicle speed V0 from the vehicle speed sensor 8, the distance Dr between the rear vehicle and the subject vehicle 1 from the rear stereo image recognizer 4r, the relative speed Vr between the rear vehicle and the subject vehicle 1 from the relative speed calculation unit 7b, and the rear-end collision risk coefficient Kr3 from the rear-end collision risk coefficient calculation unit 7d. The rear-end collision risk Rr of the subject vehicle 1 by the rear vehicle is calculated with Equation (5) as follows, and the calculated rear-end collision risk Rr is output to the target deceleration calculation unit 7g and the alarm control unit 7h:

$$Rr=1/(Kr1-THWr-Kr2-Kr3\cdot(1/TTCr)) \qquad (5),$$

where THWr is a time headway of the rear vehicle, which is obtained with calculation using THWr=Dr/Vr0, Vr0 being a speed of the rear vehicle obtained with calculation using Vr0=V0+Vr, TTCr is an margin time to rear-end collision TTCr of the subject vehicle 1, which is obtained with calculation using TTCr=Dr/Vr, and Kr1 and Kr2 are weighting coefficients preset by experiments or the like, by comparing these coefficients with the weighting coefficient Kf1 and Kf2 of the front-end collision risk Rf against the front vehicle, the Kr1 and Kr2 being set to satisfy relationships of Kr1<Kf1, and Kr2>Kf2. The driver can relatively easily recognize the distance Df between the front vehicle and the subject vehicle 1, the relative speed Vf between the front vehicle and the subject vehicle 1, and the brake operating state of the front vehicle (in particular, an operating state of a stop light). However, the driver recognizes the rear vehicle only through a mirror, and a time the driver looks at the mirror must be short. It is difficult to recognize the distance Dr from the subject vehicle 1 to the rear vehicle, the relative speed Vr between the rear vehicle and the subject vehicle 1, and the brake operating state of the rear vehicle. Thus, the weighting coefficients Kr1 and Kr2 are set to satisfy, in particular, the relationship of Kr2>Kf2 in this embodiment. Accordingly, regarding the rear-end collision risk Rr by the rear vehicle, evaluation is emphasized on the element of the relative speed Vr between the rear vehicle and the subject vehicle 1 difficult to be recognized by the driver more than the element of the relative speed Vf between the front vehicle and the subject vehicle 1 in the front-end collision risk Rf against the front vehicle. Hence, the drive assist control to which the actual drive state is reflected can be performed. Also, in addition to the weighting coefficient Kr2, the weighting coefficient Kr3, which is 1.0 or larger, is integrated in the term of (1/TTCr) in the rear-end collision risk Rr of the subject vehicle 1 by the rear vehicle in this embodiment. Accordingly, the weight of the term (1/TTCr) is further increased in a drive region, for example, in the situation in which the rear vehicle is not decelerated although the subject vehicle 1 is rapidly decelerated. Hence, a risk to the driver can be set by further proper weighting.

In this embodiment, the relative speed calculation unit 7b, the relative speed change calculation unit 7c, the rear-end collision risk coefficient calculation unit 7d, and the rear-end collision risk calculation unit 7f serve as rear-end collision risk calculating means.

The target deceleration calculation unit 7g receives the front-end collision risk Rf against the front vehicle from the front-end collision risk calculation unit 7e, and the rear-end collision risk Rr by the rear vehicle from the rear-end collision risk calculation unit 7f. The target deceleration calculation unit 7g, by using a difference (Rf-Rr), sets a target deceleration correction amount J with reference to a preset map (for example, FIG. 6), corrects the previous target deceleration At(k−1) with the target deceleration correction amount J, calculates a current target deceleration At(k) (see Equation (6)), and outputs the current deceleration At(k) to the brake control unit 10. Equation (6) is as follows:

$$At(k)=At(k-1)+Kj\cdot J \qquad (6),$$

where Kj is an integral coefficient.

When the brake control unit 10 receives the target deceleration At from the target deceleration calculation unit 7g, the brake control unit 10 controls the deceleration state with a current brake pressure to the target deceleration At. Alternatively, the brake control may be performed only when a difference between the target deceleration At and a current deceleration is a predetermined value or larger.

The alarm control unit 7h receives the front-end collision risk Rf against the front vehicle from the front-end collision risk calculation unit 7e, and the rear-end collision risk Rr by the rear vehicle from the rear-end collision risk calculation unit 7f. When the front-end collision risk Rf against the front vehicle becomes a preset threshold value or larger, the alarm control unit 7h outputs an alarm indication for the front vehicle on the display 9. When the rear-end collision risk Rr by the rear vehicle becomes a preset threshold value or larger, the alarm control unit 7h outputs an alarm indication for the rear vehicle on the display 9. When the alarm indication is provided on the display 9, an alarm with voice or chime may be additionally provided.

The target deceleration calculation unit 7g and the alarm control unit 7h serve as control means.

A drive assist control program executed by the control unit 7 will be described with reference to a flowchart in FIG. 3. In step (referred to as "S" hereinafter) 101, necessary parameters are read.

Then, in S102, the relative speed calculation unit 7a calculates the relative speed Vf between the front vehicle and the subject vehicle 1 with Equation (1) described above.

Then, in S103, the relative speed calculation unit 7b calculates the relative speed Vr between the rear vehicle and the subject vehicle 1 with Equation (2) described above.

Then, in S104, the relative speed change calculation unit 7c calculates the relative speed change Ar with Equation (3) described above.

Then, in S105, the rear-end collision risk coefficient calculation unit 7d sets the rear-end collision risk coefficient Kr3 with reference to the preset map (FIG. 5) by using the value (A−Ar) obtained by subtracting the relative speed change Ar from the deceleration A of the subject vehicle 1.

Then, in S106, the front-end collision risk calculation unit 7e calculates the front-end collision risk Rf against the front vehicle with Equation (4) described above.

Then, in S107, the rear-end collision risk calculation unit 7f calculates the rear-end collision risk Rr by the rear vehicle with Equation (5) described above.

Then, in S108, the target deceleration calculation unit 7g sets the target deceleration correction amount J with reference to the preset map (for example, FIG. 6), corrects the previous target deceleration At(k−1) with the target deceleration correction amount J (with Equation (6) described above), and calculates the current target deceleration At(k).

Then, in S109, when the front-end collision risk Rf against the front vehicle becomes the preset threshold value or larger, the alarm control unit 7h outputs the alarm indication for the front vehicle on the display 9.

Then, in S110, when the collision risk Rr against the rear vehicle becomes the preset threshold value or larger, the alarm control unit 7h outputs the alarm indication for the rear vehicle on the display 9.

Then, in S111, the brake control unit 10 controls the deceleration state with the current brake pressure to the target deceleration At. Then, the program is ended.

As described above, with the embodiment of the present invention, the front-end collision risk Rf of the subject vehicle 1 against the front vehicle is set in accordance with the time headway THWf of the subject vehicle 1 and the margin time to front-end collision TTCf of the subject vehicle 1, and the rear-end collision risk Rr of the subject vehicle 1 by the rear vehicle is set in accordance with the time headway THWr of the rear vehicle and the margin time to rear-end collision TTCr of the subject vehicle 1, the margin time to rear-end collision TTCr having a larger weight than that of the margin time to front-end collision TTCf of the front-end collision risk Rf against the front vehicle. The brake control and the alarm control are performed in accordance with the front-end collision risk Rf against the front vehicle and the rear-end collision risk Rr by the rear vehicle. Accordingly, the travel states of the front vehicle, the subject vehicle, and the rear vehicle can be properly recognized, drive can be assisted such that the subject vehicle position relative to the front vehicle and the rear vehicle becomes an optimum position corresponding to actual travel by taking into account the drive states of the front vehicle and the subject vehicle and the drive states of the subject vehicle and the rear vehicle, thereby improving feeling of drive.

The brake control and the alarm control described in this embodiment are merely examples, and other control method may be employed.

Also, while the front vehicle and the rear vehicle are detected by using information obtained from images of the stereo cameras in this embodiment, it is not limited thereto. For example, detection may rely on a single reflex camera, a laser radar, etc.

What is claimed is:

1. A vehicle drive assist system, comprising:
   front vehicle information detecting means for detecting front vehicle information;
   rear vehicle information detecting means for detecting rear vehicle information;
   front-end collision risk calculating means for calculating a front-end collision risk against the front vehicle by concerning at least an element of a relative speed between the front vehicle and a subject vehicle;
   rear-end collision risk calculating means for calculating a rear-end collision risk by the rear vehicle by concerning at least an element of a relative speed between the rear vehicle and the subject vehicle with a larger weight than a weight of the element of the relative speed in the front-end collision risk against the front vehicle; and
   control means for performing travel control in accordance with the front-end collision risk against the front vehicle and the rear-end collision risk by the rear vehicle.

2. The vehicle drive assist system according to claim 1,
   wherein the element of the relative speed between the front vehicle and the subject vehicle used by the front-end collision risk calculating means is a margin time to front-end collision obtained by dividing a distance between the front vehicle and the subject vehicle by the relative speed between the front vehicle and the subject vehicle, and
   wherein the element of the relative speed between the rear vehicle and the subject vehicle used by the rear-end collision risk calculating means is a margin time to rear-end collision obtained by dividing a distance between the rear vehicle and the subject vehicle by the relative speed between the rear vehicle and the subject vehicle.

3. The vehicle drive assist system according to claim 1,
   wherein the front-end collision risk against the front vehicle is set in accordance with a time headway of the subject vehicle obtained by dividing the distance between the front vehicle and the subject vehicle by a speed of the subject vehicle and in accordance with a margin time to front-end collision obtained by dividing the distance between the front vehicle and the subject vehicle by the relative speed between the front vehicle and the subject vehicle, and
   wherein the rear-end collision risk by the rear vehicle is set in accordance with a time headway of the rear vehicle obtained by dividing the distance between the rear vehicle and the subject vehicle by a speed of the rear vehicle and in accordance with a margin time to rear-end collision obtained by dividing the distance between the rear vehicle and the subject vehicle by the relative speed between the rear vehicle and the subject vehicle.

4. The vehicle drive assist system according to claim 1, wherein the rear-end collision risk calculating means corrects the rear-end collision risk by the rear vehicle by an increased correction amount, in accordance with a change in the relative speed between the rear vehicle and the subject vehicle and a deceleration of the subject vehicle, at least in a drive region in which the rear vehicle moves close to the subject vehicle.

5. The vehicle drive assist system according to claim 1, wherein the control means performs travel control through calculation of a target deceleration of the subject vehicle by using a difference between the front-end collision risk against the front vehicle and the rear-end collision risk by the rear vehicle.

6. The vehicle drive assist system according to claim 1, wherein the control means performs alarm control by using at least one of the front-end collision risk against the front vehicle and the rear-end collision risk by the rear vehicle.

7. The vehicle drive assist system according to claim 1, wherein the larger weight element used by the rear-end collision risk calculating means comprises a risk coefficient that is adjusted in accordance with a change in the relative speed between the rear vehicle and the subject vehicle (Ar) and a deceleration of the subject vehicle (A)).

8. The vehicle drive assist system according to claim 7, wherein the risk coefficient is adjusted by the rear-end collision risk calculating means in accordance with a variation in the value of (A-Ar) such that when A-Ar is less than a first comparison value the risk coefficient is set at a first coefficient value and wherein when A-Ar is more than the first comparison value the risk coefficient is set to a larger coefficient value.

9. A vehicle drive assist system, comprising:
   a front vehicle information recognizer that detects front vehicle information;
   a rear vehicle information recognizer that detects rear vehicle information;
   a front-end collision risk calculator that is configured to calculate a front-end collision risk against the front vehicle based on information concerning at least an element of a relative speed between the front vehicle and a subject vehicle and a distance Df between the subject vehicle and the front vehicle extending along a longitudinal axis of the vehicle;

a rear-end collision risk calculator that is configured to calculate a rear-end collision risk by the rear vehicle based on a distance Dr extending along the longitudinal axis between the subject vehicle and the rear vehicle and based on information concerning at least an element of a relative speed between the rear vehicle and the subject vehicle with a larger weight than a weight of the element of the relative speed in the front-end collision risk against the front vehicle; and a target deceleration calculation unit that performs travel control to adjust a relative positioning of the subject vehicle relative to each of the distance Df to the front vehicle and the distance Dr to the rear vehicle in accordance with concurrently used input information as to the front-end collision risk against the front vehicle and the rear-end collision risk by the rear vehicle, with the rear-end collision risk being weighted higher relative to the front end collision risk even under circumstances wherein front and rear margin times and front and rear time headway values are equal in magnitude.

10. The vehicle drive assist system according to claim 9, further comprises an alarm control unit that is in communication with each of said rear-end collision risk calculator and front-end collision risk calculator and is further configured to generate an alarm upon either of the front end collision risk or the rear end collision risk reaching a respective threshold collision risk value.

11. The vehicle drive assist system according to claim 9, wherein the element of the relative speed between the front vehicle and the subject vehicle used by the front-end collision risk calculator is a margin time to front-end collision obtained by dividing a distance between the front vehicle and the subject vehicle by the relative speed between the front vehicle and the subject vehicle, and
wherein the element of the relative speed between the rear vehicle and the subject vehicle used by the rear-end collision risk calculator is a margin time to rear-end collision obtained by dividing a distance between the rear vehicle and the subject vehicle by the relative speed between the rear vehicle and the subject vehicle.

12. The vehicle drive assist system according to claim 9, wherein the front-end collision risk against the front vehicle is set in accordance with a time headway of the subject vehicle obtained by dividing the distance between the front vehicle and the subject vehicle by a speed of the subject vehicle and in accordance with a margin time to front-end collision obtained by dividing the distance between the front vehicle and the subject vehicle by the relative speed between the front vehicle and the subject vehicle, and
wherein the rear-end collision risk by the rear vehicle is set in accordance with a time headway of the rear vehicle obtained by dividing the distance between the rear vehicle and the subject vehicle by a speed of the rear vehicle and in accordance with a margin time to rear-end collision obtained by dividing the distance between the rear vehicle and the subject vehicle by the relative speed between the rear vehicle and the subject vehicle.

13. The vehicle drive assist system according to claim 9, wherein the rear-end collision risk calculator is configured to correct the rear-end collision risk by the rear vehicle by an increased correction amount, in accordance with a change in the relative speed between the rear vehicle and the subject vehicle (Ar) and a deceleration of the subject vehicle (A).

14. The vehicle drive assist system according to claim 13, wherein the larger weight element used by the rear-end collision risk calculator is adjusted in accordance with a variation in the value of (A-Ar).

15. The vehicle drive assist system according to claim 9, wherein the larger weight element used by the rear-end collision risk calculator comprises a risk coefficient that is adjusted in accordance with a change in the relative speed between the rear vehicle and the subject vehicle (Ar) and a deceleration of the subject vehicle (A).

16. The vehicle drive assist system according to claim 15, wherein the risk coefficient is adjusted by the rear-end collision risk calculator in accordance with a variation in the value of (A-Ar) such that when A-Ar is less than a first comparison value the risk coefficient is set at a first coefficient value and wherein when A-Ar is more than the first comparison value the risk coefficient is set to a larger coefficient value.

17. The vehicle drive assist system according to claim 16, wherein when A-Ar is less than the first comparison value the risk coefficient is set by the rear-end collision risk calculator at a first coefficient value that is fixed, and wherein, when A-Ar is more than the comparison value, the risk coefficient is set by the rear-end collision risk calculator adjustably with the level of increase based on the amount that A-Ar exceeds the comparison value.

18. The vehicle drive assist system according to claim 17, wherein the risk coefficient is linearly adjusted relative to the amount that A-Ar exceeds the comparison value.

19. The vehicle drive assist system according to claim 16, wherein when A-Ar is less than the first comparison value the risk coefficient is set by the rear-end collision risk calculating means at a first coefficient value that is fixed, and wherein, when A-Ar is more than the comparison value, the risk coefficient is set by the rear-end collision risk calculating means adjustably with the level of increase in the weight value of the first coefficient based on the amount that A-Ar exceeds the comparison value.

20. The vehicle drive assist system according to claim 9, wherein the target deceleration calculation unit is configured to perform subject vehicle travel control through calculation of a target deceleration of the subject vehicle by using a difference between the front-end collision risk against the front vehicle and the rear-end collision risk by the rear vehicle.

* * * * *